United States Patent
Ichimiya

(10) Patent No.: US 7,412,159 B2
(45) Date of Patent: Aug. 12, 2008

(54) IMAGE PICKUP APPARATUS AND DEFOCUS AMOUNT CORRECTION VALUE CALCULATION METHOD

(75) Inventor: Takashi Ichimiya, Yokohama (JP)

(73) Assignee: Canon Kabushiki Kaisha (JP)

( * ) Notice: Subject to any disclaimer, the term of this patent is extended or adjusted under 35 U.S.C. 154(b) by 321 days.

(21) Appl. No.: 11/185,644

(22) Filed: Jul. 20, 2005

(65) Prior Publication Data
US 2006/0018650 A1 Jan. 26, 2006

(30) Foreign Application Priority Data
Jul. 21, 2004 (JP) .............................. 2004-212441

(51) Int. Cl.
*G03B 3/00* (2006.01)
(52) U.S. Cl. ............................ 396/104; 396/91; 396/92; 396/93; 396/106; 396/125; 348/345; 348/348; 348/353; 250/201.2; 250/201.6; 250/201.7; 250/201.8
(58) Field of Classification Search .................. 396/91, 396/104, 106, 125, 109
See application file for complete search history.

(56) References Cited

U.S. PATENT DOCUMENTS

| | | | | |
|---|---|---|---|---|
| 5,305,047 | A * | 4/1994 | Hayakawa et al. | 396/106 |
| 6,222,996 | B1 * | 4/2001 | Nonaka | 396/104 |
| 6,229,568 | B1 * | 5/2001 | Kawaguchi et al. | 348/350 |
| 6,603,929 | B2 * | 8/2003 | Ishikawa et al. | 396/133 |
| 6,686,966 | B1 * | 2/2004 | Hashimoto | 348/348 |
| 6,744,468 | B2 * | 6/2004 | Ohkawara et al. | 348/347 |
| 6,822,687 | B1 * | 11/2004 | Kakiuchi et al. | 348/348 |
| 2003/0020825 | A1 * | 1/2003 | Higuma et al. | 348/354 |
| 2003/0133202 | A1 * | 7/2003 | Watanabe et al. | 359/689 |
| 2003/0137748 | A1 * | 7/2003 | Mukaiya | 359/698 |
| 2004/0057712 | A1 * | 3/2004 | Sato et al. | 396/89 |
| 2004/0100573 | A1 * | 5/2004 | Nonaka | 348/345 |
| 2005/0232621 | A1 * | 10/2005 | Ito | 396/125 |

FOREIGN PATENT DOCUMENTS

| | | |
|---|---|---|
| JP | 09-054242 A | 2/1997 |
| JP | 2000-292684 A | 10/2000 |
| JP | 2001-004914 A | 1/2001 |

\* cited by examiner

*Primary Examiner*—W. B. Perkey
*Assistant Examiner*—Warren K. Fenwick
(74) *Attorney, Agent, or Firm*—Rossi, Kimms & McDowell LLP.

(57) ABSTRACT

An image pickup apparatus, in which a light is projected toward a physical object by projection means, and based on the reflected light by the physical object of the light, a defocus amount is detected (steps S2003 to S2008) by the first focus detection means and the second focus detection means, respectively, and a correction value for matching the defocus amount detected by the first focus detection means with the defocus amount detected by the second focus detection means is calculated and kept stored (step S2009), and at the photographing time, based on the defocus amount detected by the first focus detection means and the correction value kept stored, a focus adjustment lens within a photographic lens is driven, thereby preventing an inappropriate correction of the defocus amount.

6 Claims, 15 Drawing Sheets

FIG. 20

| | CORRECTION VALUE | | |
|---|---|---|---|
| | 450nm | 550nm | 650nm |
| CENTRAL HORIZONTAL FIELD OF VIEW | +10 μm | −20 μm | +12 μm |
| CENTRAL VERTICAL FIELD OF VIEW | +15 μm | −25 μm | +10 μm |
| RIGHT VERTICAL FIELD OF VIEW | +20 μm | −25 μm | +15 μm |
| LEFT VERTICAL FIELD OF VIEW | +20 μm | −25 μm | +15 μm |

IMAGE PICKUP APPARATUS AND DEFOCUS AMOUNT CORRECTION VALUE CALCULATION METHOD

FIELD OF THE INVENTION

The present invention relates to an image pickup apparatus comprising a first focus detection means for detecting a defocus amount based on phase difference of the object image photoelectrically converted by an AF sensor and a second focus detection means for outputting an estimation signal of the contrast of an object image photoelectrically converted by an image pickup sensor, and to a defocus amount correction value calculation method.

BACKGROUND OF THE INVENTION

Heretofore, in general, as a device for performing an auto focus detection (AF: auto focus) of a camera, the following camera has been known. That is, in this auto focus device, light flux from an object having passed through different exit pupil areas of an image pickup lens is focused onto a pair of line sensors. The object image is photoelectrically converted and then a pair of image signals are outputted. From a displacement amount of the relative position of this pair of image signals, a defocus amount is detected, and based on this defocus amount, the driving of the image pickup lens is performed (Patent Document 1: Japanese Patent Application Laid-Open No. H09-054242). Hereinafter, such focus detection system is referred to as a phase difference detection system.

Further, in a digital camera using an electronic image pickup sensor, an auto focus device has been also well-known, in which, while a focus position is changed by driving a photographic lens, the estimation of the contrast of an object obtained by the image pickup sensor is performed, thereby detecting an in-focus position (Patent Document 2: Japanese Patent Application Laid-Open No. 2001-004914). Hereinafter, this focus detection system is referred to as a contrast detection system.

Further, for the electronic image pickup apparatus comprising both of the phase different detection system and the contrast detection system described above, a device has been also known, in which a difference between the in-focus position detected by the phase difference detection system and the in-focus position detected by the contrast detection system is stored in advance as a correction value, and at the normal photographing time, the photographic lens is driven in accordance with the in-focus position detected by the phase difference detection system and the stored correction value (Patent Document 3 Japanese Patent Application Laid-Open No. JP 2000-292684).

Since the phase difference detection system disclosed in the Patent Document 1 can detect a defocus amount in a range from a certain focus position to an in-focus position, a time required for the in-focus detection is short. However, since an object light path obtained by the phase difference detection system is different from a object light path in the case of the actual photographing, there arises an error between the in-focus position detected by the phase difference detection system and the in-focus position in an image pickup plane.

Further, in the contrast detection system disclosed in the Patent Document 2, since the focus detection is performed on the object light path when photographing, the in-focus position on the image pickup plane can be accurately detected. However, it is necessary to perform a contrast estimation calculation while changing the in-focus position of the image pickup lens, and this arises a problem that it takes time until the in-focus position is reached.

Further, in the electronic image pickup apparatus disclosed in the Patent Document 3, there arises a problem that, though the in-focus position displacement detected by the phase difference detection system can be accurately corrected using the correction value, an appropriate correction value cannot be detected depending on the condition of the object when detecting the correction value. For example, in case the contrast of the object is low, there arises a big error in each of the detection result of the phase difference detection system and the detection result of the contrast detection system. In case of the infinite focusing distance where the distance to the object is greatly away from the normal distance, and the closest focusing distance, there arises an error in the detection result due to the influence such as the stopping accuracy of the photographic lens and the like. In addition, since the in-focus position is displaced due to chromatic aberration of the photographic lens, it is not possible to find an accurate correction value. In this manner, the correction value changes according to measurement condition, and thus, it is necessary to restore the measurement condition to a predetermined measurement condition to detect an intrinsically accurate correction value. However, while it is easy for the plant and the like to create the predetermined measurement condition, it is difficult for the general user to create the predetermined measurement condition.

SUMMARY OF THE INVENTION

A first object of the present invention is to provide a technique capable of avoiding execution of an inappropriate correction of the defocus amount.

According to one aspect of the present invention, an image pickup apparatus thereof, which controls drive of a focus adjustment lens within the photographic lens by taking at least stored correction value into consideration of a detected defocus amount, comprises:

an image pickup sensor which receives a light flux having passed through a photographic lens and photoelectrically converting the received light flux; a focus detection sensor for receiving a pair of light fluxes from the light flux having passed through the photographic lens and photoelectrically converting the received pair of light fluxes; a first focus detection unit which detects a defocus amount based on the phase difference of the object image photoelectrically converted by the focus detection sensor; a second focus detection unit which outputs an estimation signal for estimating the contrast of the object image photoelectrically converted by the image pickup sensor; and a control unit which effects control to calculate a correction value for correcting the defocus amount based on the value outputted from the first focus detection unit and the second focus detection unit, respectively, depending on the light projected by light projection unit in one light projection pattern selected from among a plurality of patterns, and store that correction value.

According to another aspect of the present invention, a light projection device thereof, which is connectable to an image pickup apparatus which drive-controls the focus adjustment lens within the photographic lens in accordance with a detected defocus amount with at least a correction value, comprises:

a light unit for projecting a light in one light pattern selected from among a plurality of patterns, and a receiving unit for receiving an instruction of the pattern for projecting a light from the image pickup apparatus of a calibration mode.

Further objects or features of the present invention will become apparent from the preferred embodiments described with reference to the following drawings.

BRIEF DESCRIPTION OF THE DRAWINGS

FIG. 20 is a view showing one example of the correction value stored by the AF calibration operation of FIG. 14 and FIG. 15.

DETAILED DESCRIPTION OF THE PREFERRED EMBODIMENTS

The preferred embodiment of the present invention will be described below with reference to the drawings.

Figure 1:
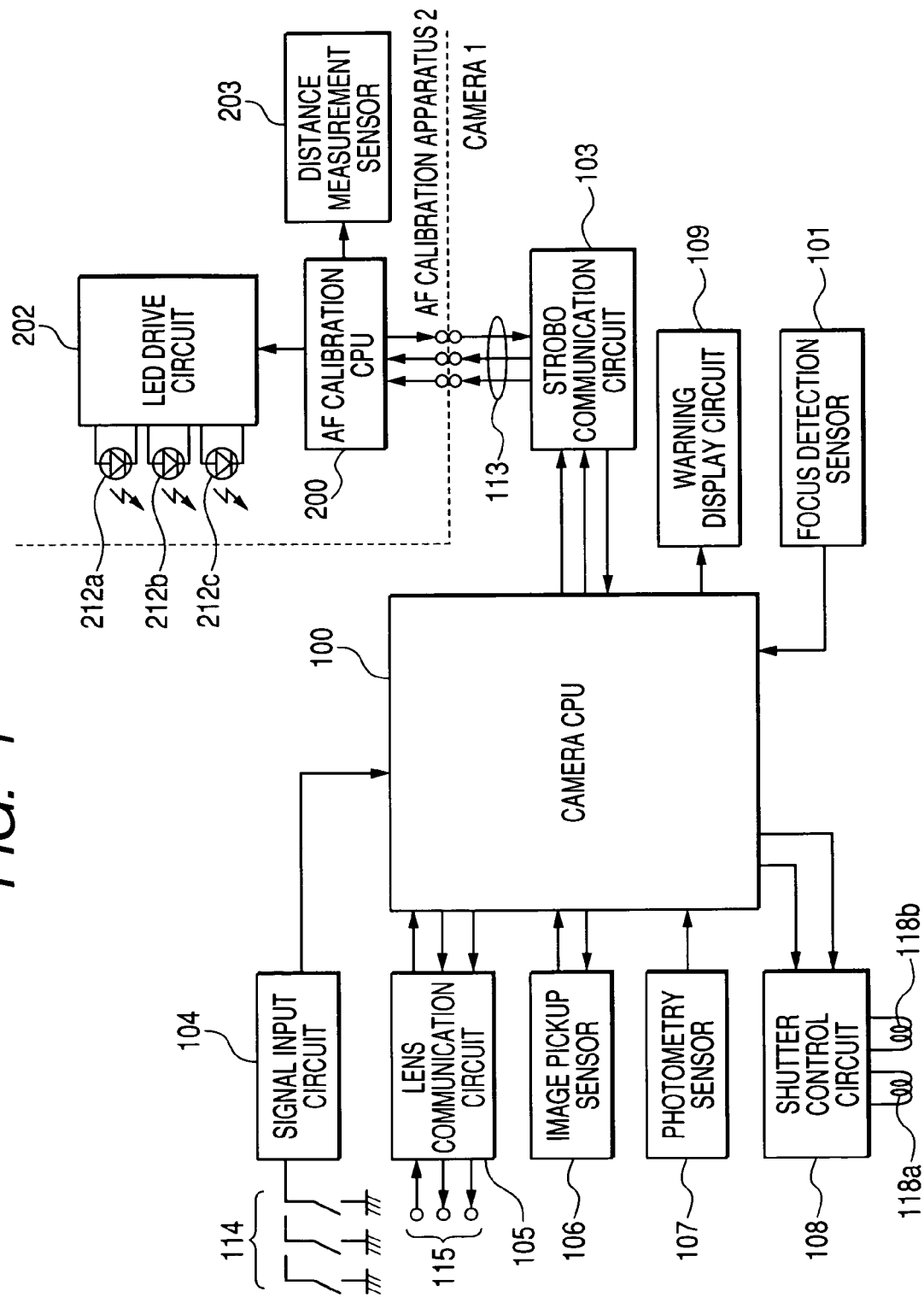
FIG. 1 is a block diagram showing a circuit configuration of an image pickup apparatus according to one embodiment of the present invention.

FIG. 1 is a block diagram showing a configuration of an image pickup apparatus comprised of a camera 1 and an AF (auto focus) calibration device 2 according to one embodiment of the present invention.

A camera microcomputer (hereinafter referred to as CPU) 100 is connected to a signal input circuit 104 for detecting a switch group 114 for setting up each mode of a camera 1, an image pickup sensor 106, a photometry sensor 107, a shutter control circuit 108 for controlling shutter magnets 118a and 118b, a focus detection sensor 101, and a warning display circuit 109. Further, a signal 115 is transmitted to an unillustrated photographic lens through a lens communication circuit 105, to perform a control of a focus position and an aperture. Further, a signal 113 is transmitted and received to and from an AF calibration CPU 200 disposed within the AF calibration device 2, through a strobo communication circuit 103.

The camera CPU 100 controls the photometry sensor 107 and the focus detection sensor 101 so as to detect the resolution of an object, and decides an aperture value and a shutter speed of the unillustrated photographic lens. Then, the cameral CPU 100 controls the aperture value through the lens communication circuit 105, and controls an energizing time of the magnets 118a and 118b through the shutter control circuit 108 so as to perform a control of the shutter speed, and performs a photographing operation by controlling the image pickup sensor 106.

Built-in the camera CPU 100 are a ROM storing a program for controlling a camera operation, a RAM for storing variables, and an EEP ROM (electrically erasable and programmable ROM) for storing various parameters.

The AF calibration CPU 200 disposed within the AF calibration device 2 performs the driving of chart projection light sources LED 212a, LED 212b, and LED 212c, and performs a control of the distance measurement sensor 203 for measuring a distance to a projection position by using the LED drive circuit 202 according to the instruction of the camera CPU 100.

Figure 2:
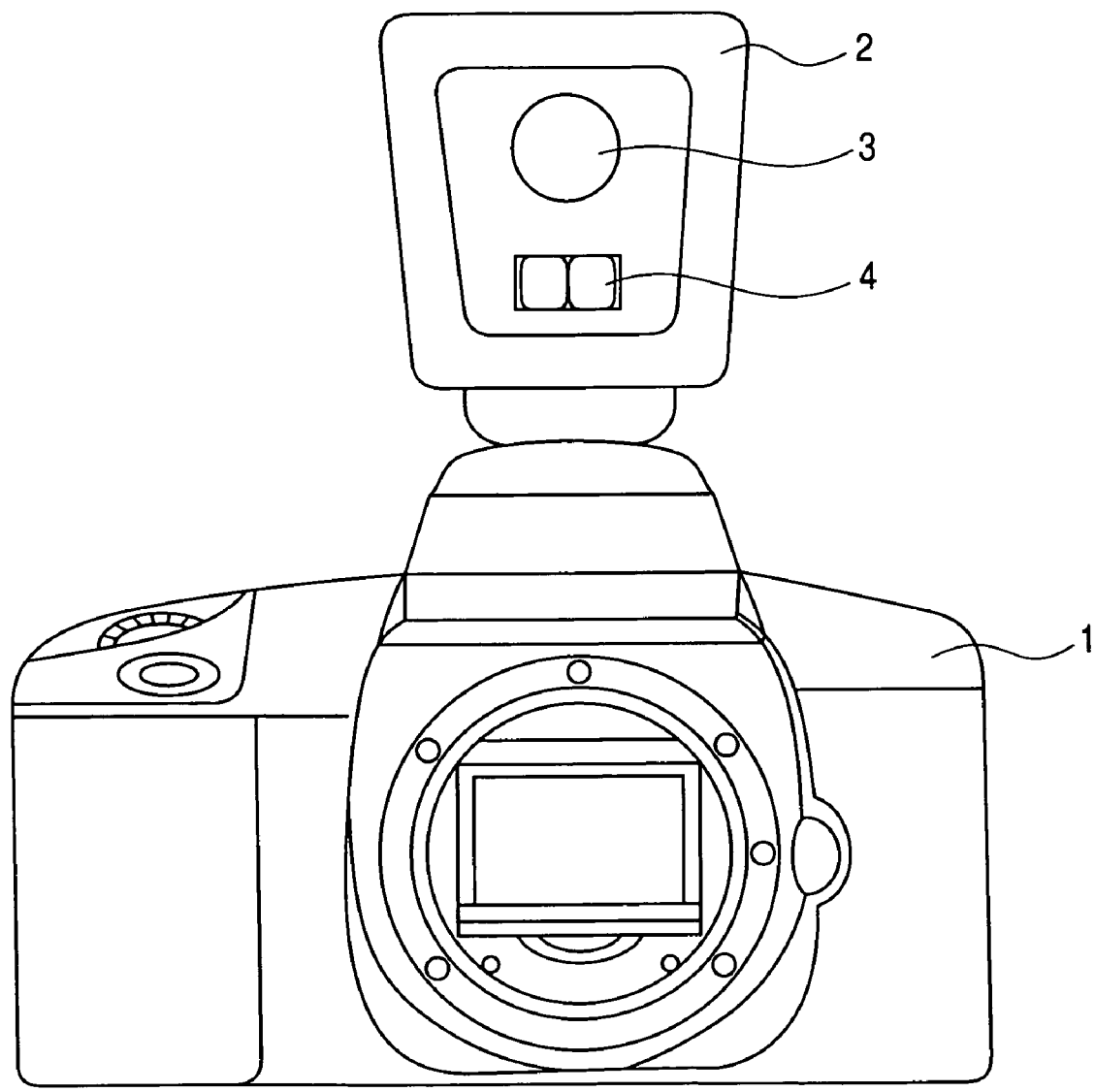
FIG. 2 is an external view of a state when a camera is mounted with an AF calibration device in one embodiment of the present invention.

FIG. 2 is an external view showing a state when the camera 1 of FIG. 1 is mounted with the AF calibration device 2, and reference numeral 3 denotes a chart projection unit, reference numeral 4 a distance measurement unit included in a distance measurement device to be described below together with the above distance measurement sensor 203.

Figure 3:
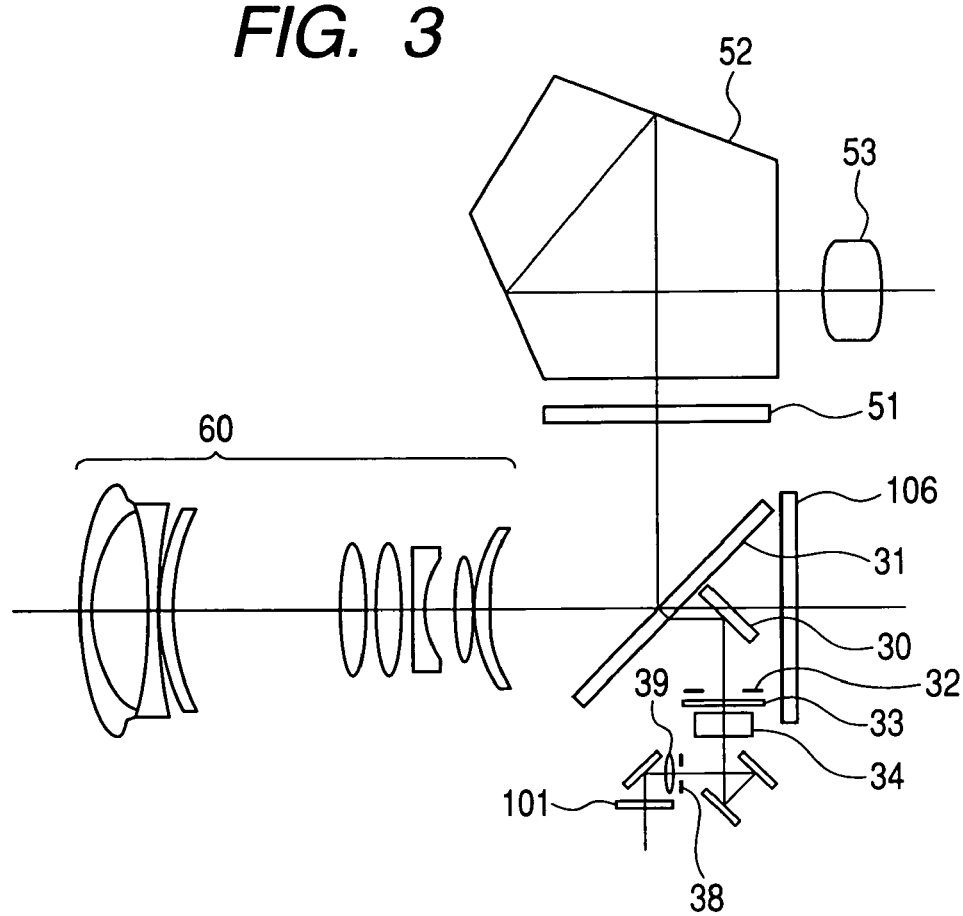
FIG. 3 is an optical layout plan of the camera according one embodiment of the present invention.

FIG. 3 is an optical layout plan of the camera 1. A majority of the projection light flux from the object incident through a photographic lens 60 is reflected above by a quick return mirror 31, and is image-formed on a finder screen 51. The user of the camera observes this image through a pentaprism 52 and an eyepiece 53. The remaining photographic light flux not reflected above transmits the quick return mirror 31, and is bent downward by a rear sub mirror 30, and is image-formed on the focus detection sensor 101 through a visual field mask 32, an infrared cut filter 33, a field lens 34, an aperture 38, and a secondary image forming lens 39. By processing an image signal obtained through the photoelectric conversion of this image, a focus state of the photographic 60 can be detected.

On occasion of photographing, the quick return mirror 31 pops up, and the photographic light flux is image-formed on the image pickup sensor 106, and exposure of an object image is performed.

The camera 1 in the present embodiment comprises two focus detection systems, and a first focus detection system which is one of those systems is a known phase difference detection system, and can detect the focus states (defocus amount) of different three areas within a screen.

Figure 4:
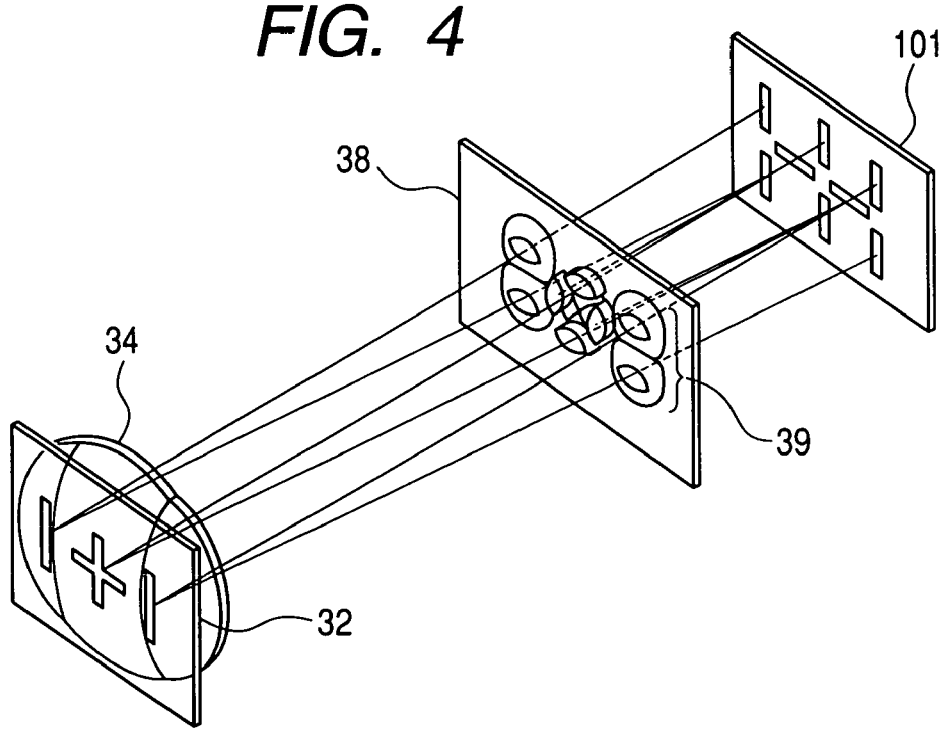
FIG. 4 is a view showing a configuration of a focus detection device of FIG. 3.

In FIG. 4 is shown a detailed configuration of the focus detection system. The light flux from the object reflected by the sub mirror 30 shown in FIG. 3 is image-formed once in the vicinity of the visual field mask 32 in FIG. 4. The visual field mask 32 is a light shielding member for deciding a focus detection area within the screen, and has a cruciform opening in the center and two longitudinal openings at both sides. Three lenses configuring a field lens 34 correspond to three openings of the visual field mask 32. In the rear of the field lens 34, there is disposed an aperture 38, and in the center portion thereof, there are provided a total of four openings for one pair each up and down, and a pair of two openings in the left and right fringes, respectively.

The field lens 34 has an action to image-form each opening of the aperture 38 in the vicinity of an exit pupil of the photographic lens 60. In the rear of the aperture 38, there is a secondary image-forming lens 39, which is configured by four pairs of total eight lenses, and each lens corresponds to each opening of the aperture 38. Each light flux having passed through the visual field mask 32, the field lens 34, the aperture 38, and the secondary image-forming lens 39 is image-formed on four pairs of eight sensor arrays on the focus detection sensor 101.

Figure 5:
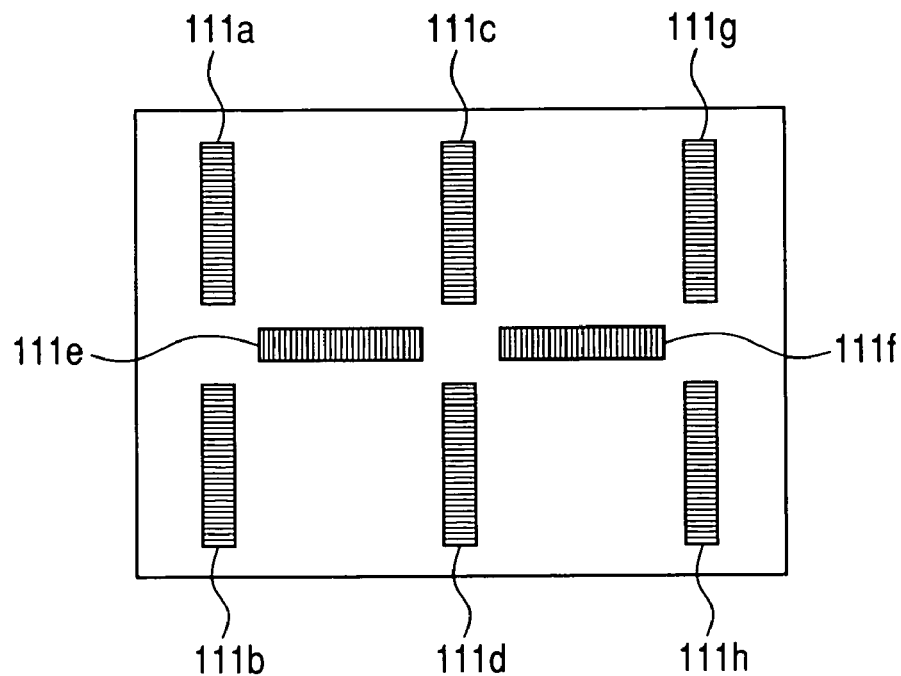
FIG. 5 is a view showing sensor arrays of FIG. 4.
Figure 6:
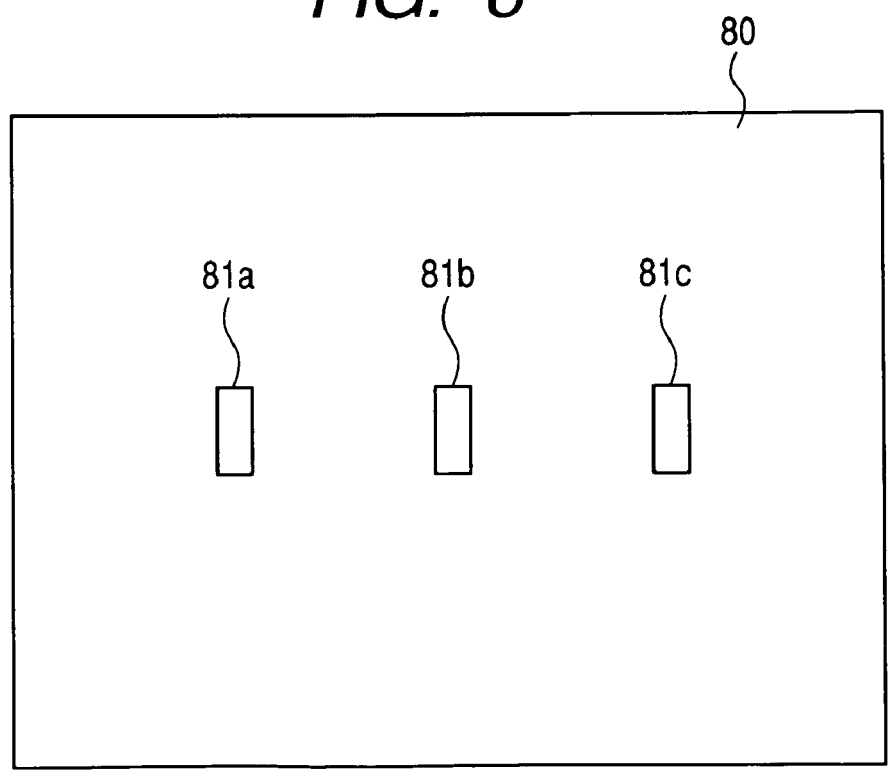
FIG. 6 is a view showing a focus detection field within a photographic screen of the focus detection device of a phase difference system of FIG. 4.

Next, a relation between the sensor arrays and the focus detection area within the screen will be described by using FIGS. 5 and 6. A pair of sensor arrays 111a and 111b correspond to a focus detection field 81a, and a pair of sensor arrays 111c and 111d and a pair of sensor arrays 111e and 111f correspond to a focus detection field 81b, and sensor arrays 111g and 111h correspond to a focus detection field 81c, respectively.

The images on each pair of sensor arrays are photoelectrically converted, and relative positional displacements of four pairs of image signals are detected, so that a focus state of focus detection area of a total three places including one place for vertical and horizontal and two places for fringes can be detected. Further, in the pixels of respective sensor arrays, there are provided a plurality of color filters different from each other in transmission wavelength, and it is also possible to determine wavelength components of the light from the object from a ratio of pixel signals.

In the present embodiment, hereinafter, the focus detection area of the pair of sensor arrays 111c and 111d of the focus detection field 81b is referred to as "center vertical field of view", the focus detection area of the pair of sensor arrays 111e and 111f of the focus detection field 81b is referred to as "center horizontal field of view", the focus detection area of the pair of sensor arrays 111a and 111b of the focus detection field 81a is referred to as "left vertical field of view", and the focus detection area of the pair of sensor arrays 111g and 111h of the focus detection filed 81c is referred to as "right vertical field of view".

Further, as a second focus detection system in the present embodiment, a contrast detection system using an image signal from the known image pickup sensor 106 is used, and it is possible to detect focus states of three areas corresponding to the focus detection areas (focus detection fields 81a, 81b, and 81c) by a first focus detection system.

Figure 7:
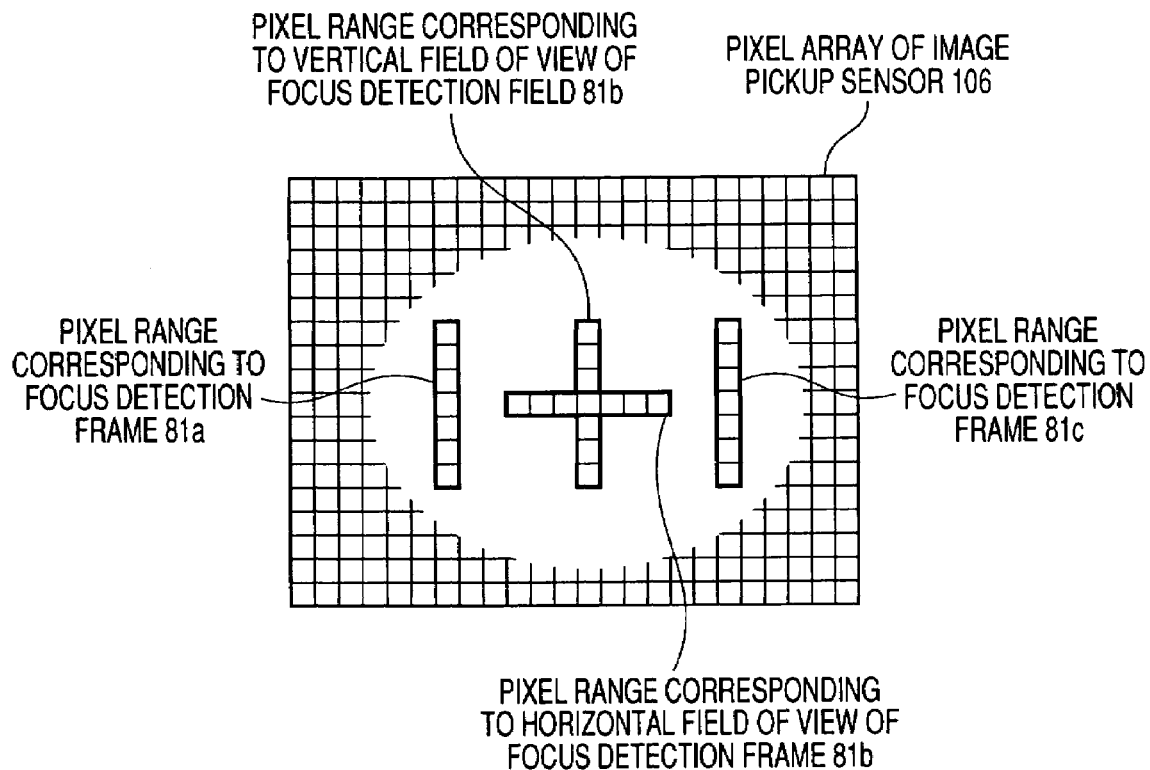
FIG. 7 is a view showing a position relation of the pixel range calculating a contrast estimation value by an image pickup sensor and a contrast detection system in one embodiment of the present invention.

A positional relation between the image pickup sensor 106 and the pixel range performing a contrast calculation is shown in FIG. 7. The pixel range corresponds to each focus detection frame and focus detection field of view.

Figure 8:
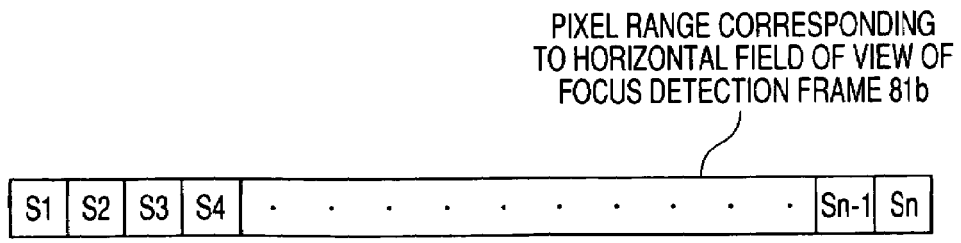
FIG. 8 is an enlarged view of the pixel range corresponding to a horizontal field of view of a focus detection field 81b of FIG. 7.

An enlarge view of the pixel range corresponding to the horizontal field of view of the focus detection field 81b of FIG. 7 is shown in FIG. 8. As shown in FIG. 8, if the signal of each pixel is represented by S1, S2 . . . Sn, the contrast estimation value can be represented by the following formula 1.

$$\text{Contrast estimation value} = \sum_{k=1}^{n-1} (S_{k+1} - S_k)^2 \qquad (1)$$

Figure 9:
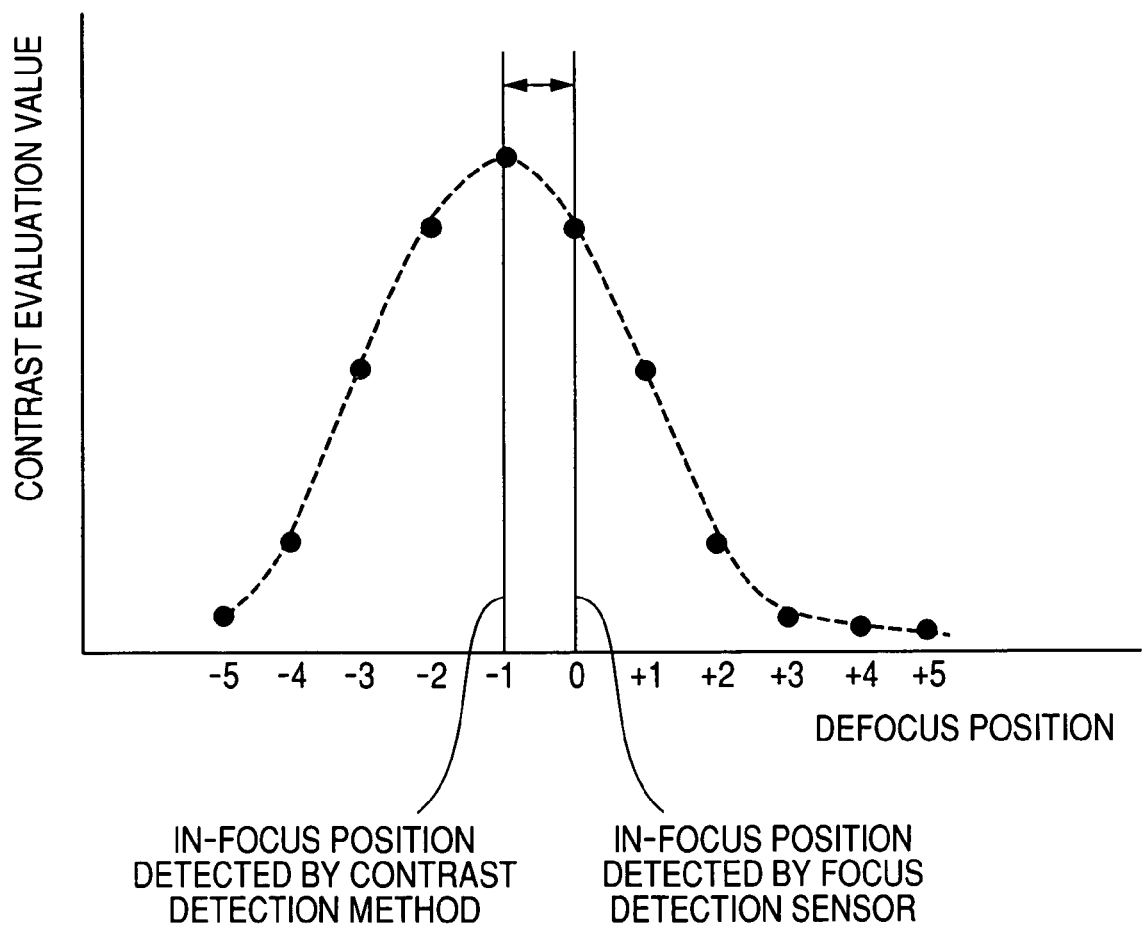
FIG. 9 is a view showing a calculation result of the contrast estimation value of a signal obtained by the image pickup sensor in one embodiment of the present invention.

In FIG. 9 is shown a result of the calculation of the contrast estimation performed on the signal obtained by the image pickup sensor 106 using the above described formula, while photographing by shifting an in-focus position for every predetermined interval from the in-focus position detected by the first focus detection system.

In FIG. 9 is shown the contrast estimation result when the focus position is shifted at predetermined intervals of five points back and forth from the in-focus position detected by the first focus detection system, and in this case, the in-focus position at −1 is the maximum in the contrast estimation value, and becomes the in-focus position detected by the second focus detection system. The difference between the in-focus position by the first focus detection system and the in-focus position by the second focus detection system is used as the correction amount of the first focus detection system used at the actual photographing time.

Next, a chart projection optical system within the AF calibration device 2 will be described by using FIG. 10.

LEDs 212a, 212b, and 212c are LEDs having different wavelength bands, and are disposed so as to illuminate a chart pattern slit 702, respectively. The illuminated chart pattern slit 702 is projected on a projection plane as a chart light through projection lens 703. By changing over the LEDs 212a, 212b, and 212c and driving them in order, the wavelength of the projection light can be changed over. While, in a state of FIG. 10, the projection of the horizontal line chart light is performed, by rotating the chart pattern slit 702 by 90 degrees, the projection of the vertical line chart light can be also performed.

Figure 16:
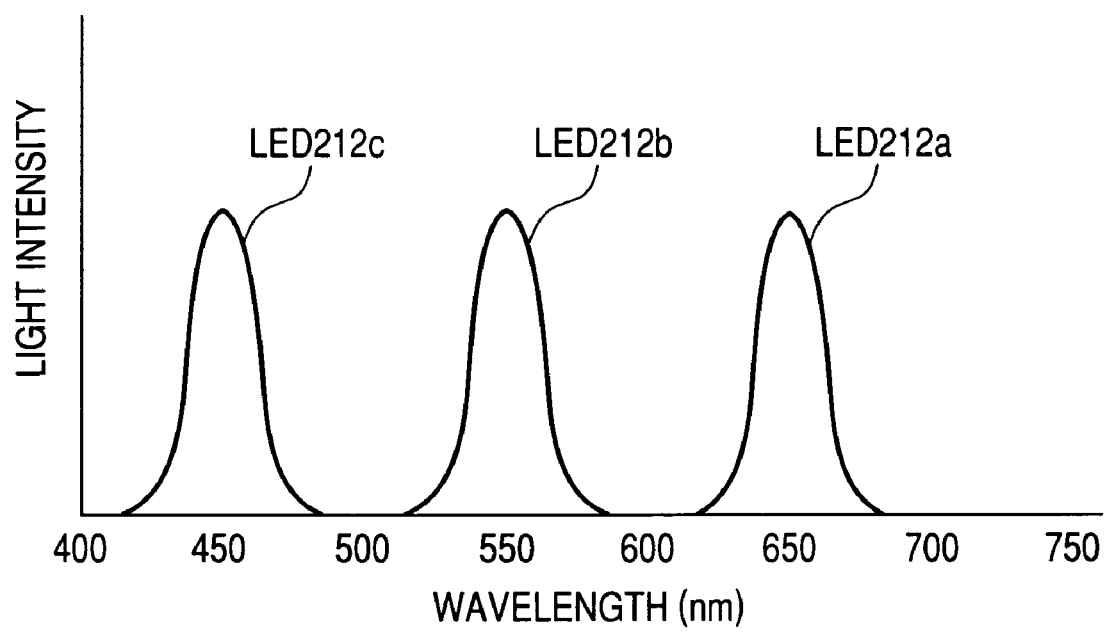
FIG. 16 is a view showing spectral wavelength characteristics of respective three LEDs which are chart projection light sources in one embodiment of the present invention.

The spectral wavelength characteristics of the LEDs 212a, 212b, and 212c are shown in FIG. 16. The LED 212a has a characteristic of the center wavelength of 650 nm, the LED 212b a characteristic of the center wavelength of 550 nm, the LED 212c a characteristic of the center wavelength of 450 nm.

Figure 11A:
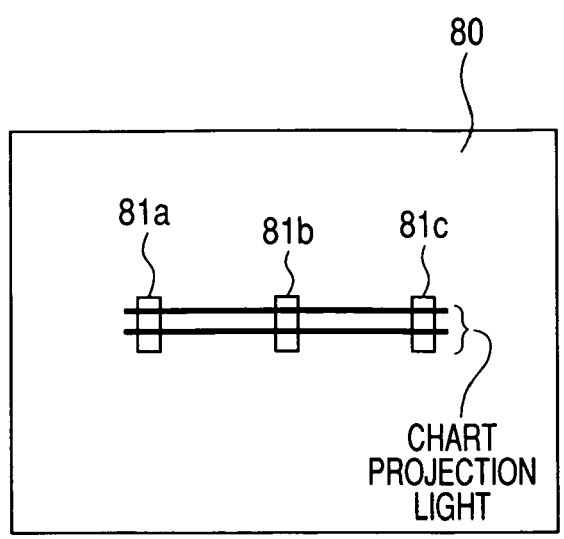
FIGS. 11A and 11B are views showing the positional relation between the focus detection field within a finder and a chart projection light in one embodiment of the present invention.
Figure 11B:
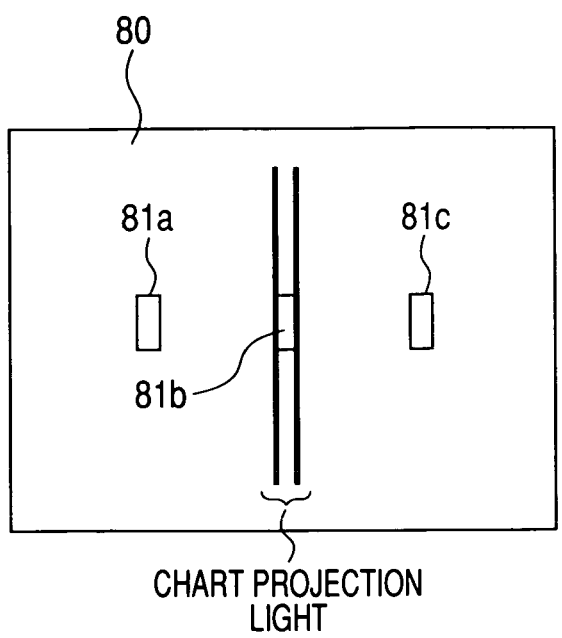

A positional relation between the focus detection field within a finder 80 and the chart is shown in FIGS. 11A and 11B. FIG. 11A is a view projecting the chart light of a horizontal line chart, which is projected so as to be orthogonal to the left vertical field of view of the focus detection field 81a, the central vertical field of view of the focus detection field 81b, and the right vertical field of view of the focus detection field 81c. In the meantime, FIG. 11B is a view of projecting the chart light of the vertical line chart, which is projected so as to be orthogonal to the central horizontal field of view of the focus detection field 81b.

Figure 10:
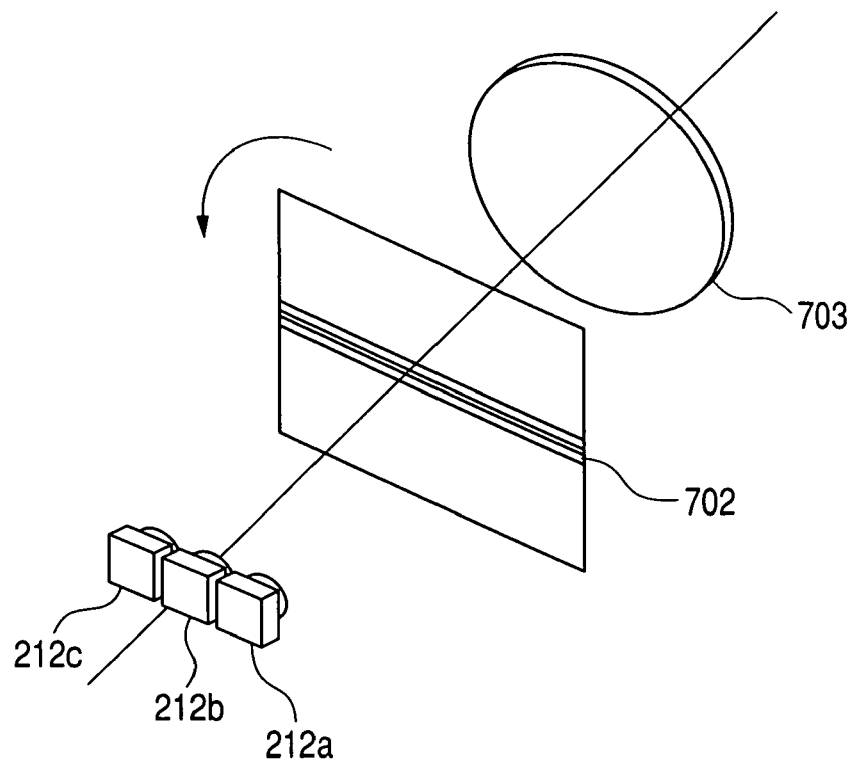
FIG. 10 is an optical block diagram according to a chart projection within the AF calibration device of FIG. 1.

In FIG. 10, while both the slit (702) and the projection lens (703) are used for the LEDs 212a, 212b, and 212c, the slit and the projection lens may be configured separately for each LED.

Next, the distance measurement device within the AF calibration device 2 will be described by using FIGS. 12 and 13. The distance measurement device within the AF calibration device 2 in the present embodiment uses a known passive system, and measures a distance from the AF calibration device 2 to the projection plane.

Figure 12:
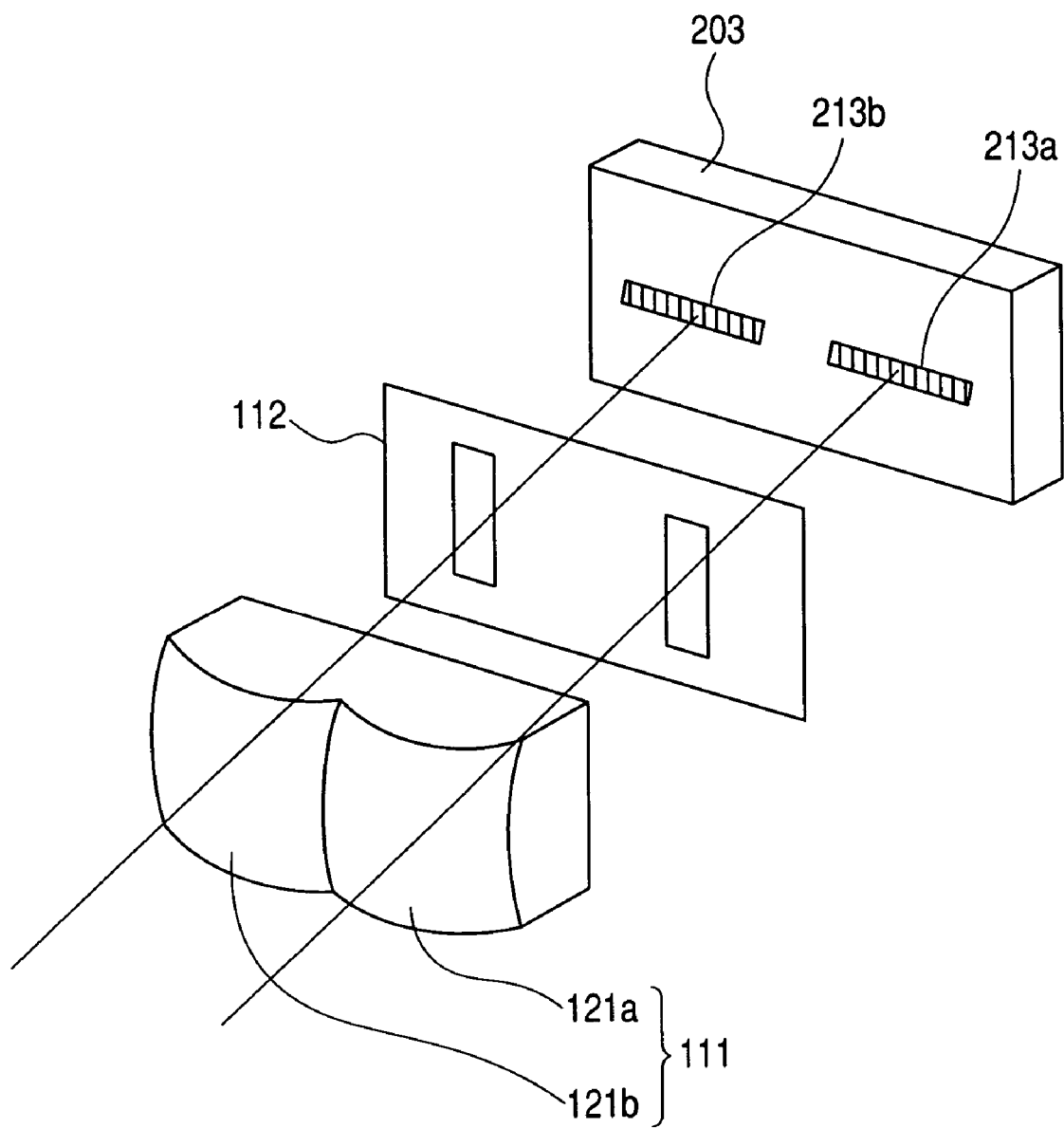
FIG. 12 is a block diagram of a distance measurement device within the AF calibration device of FIG. 1.

The detailed configuration of the distance measurement device is shown in FIG. 12. A distance measurement lens 111 is configured by lens 121a and 121b having a pair of optical axes. Further, the distance measurement sensor 203 is configured by a pair of line sensors 213a and 213b, and a line sensor 213a is disposed on the optical axis of the lens 121a, and a line sensor 213b is disposed on the optical axis of the lens 121b. The light flux from the projection plane passes through the lenses 121a and 121b, respectively, and is image-formed by the line sensors 213a and 213b located at the rear side. Between the distance measurement lens 111 and the distance measurement sensor 203, there is a visual field mask 112, in which openings are disposed so as to prevent the light flux having passed through the lens 112a from advancing to the line sensor 213b, and the light flux having passed through the lens 112b from advancing to the line sensor 213a.

Figure 13:
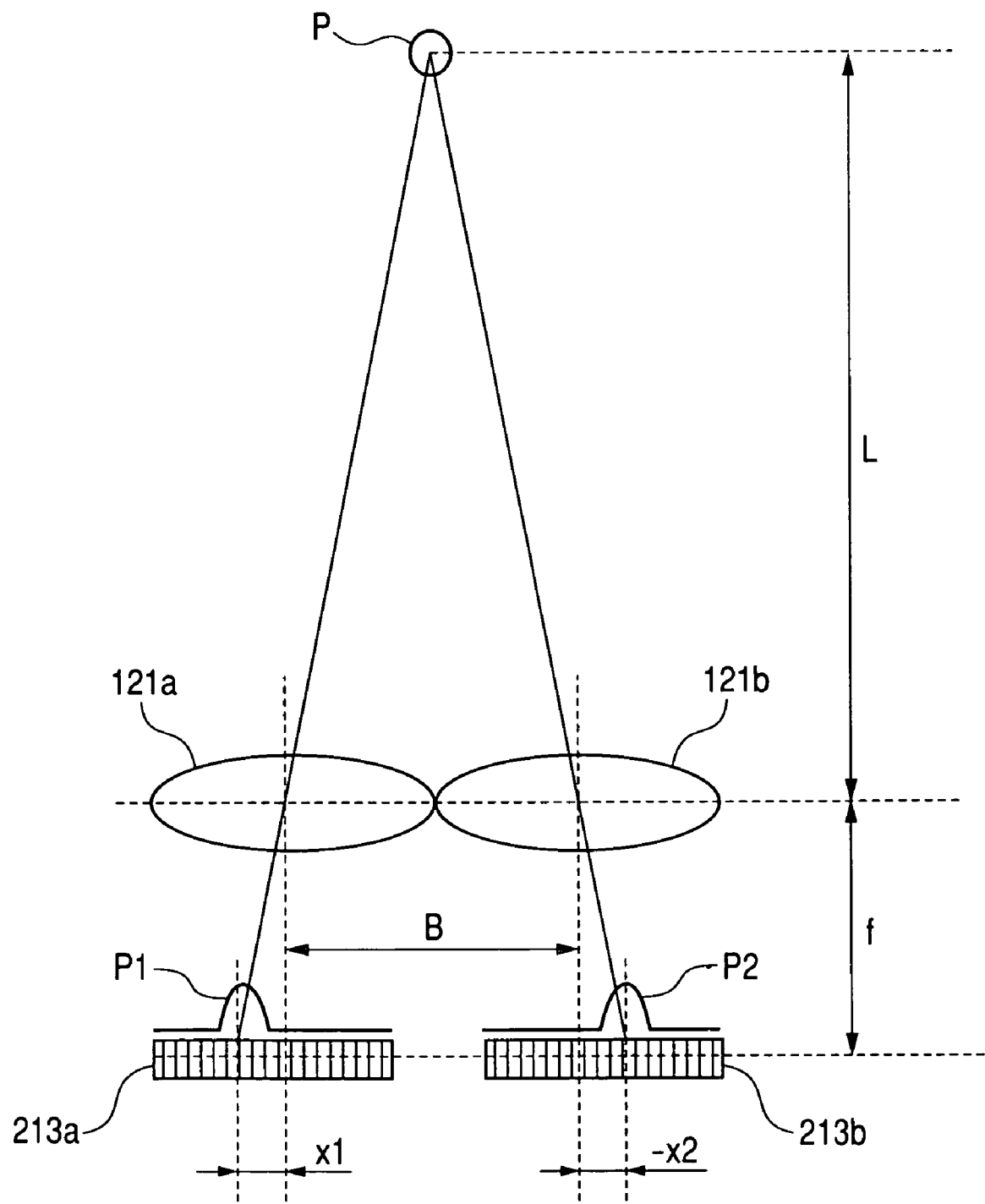
FIG. 13 is a view explaining a principle of a distance measurement system (passive system) of the distance measurement device of FIG. 12.

The distance measurement system (passive system) of the distance measurement device in the present embodiment will be briefly described by using FIG. 13. By lenses 121a and 121b, an object light source P is image-formed on the line sensors 213a and 213b which are photo diode arrays, as object images P1 and P2. In this manner, signals corresponding to the positions of the object images P1 and P2 are outputted from the line sensors 213a and 213b.

The AF calibration CPU 200 of FIG. 1 finds the phase differences x1 and x2 of the two object images P1 and P2 from these signals, and calculates an object distance L by Formula 2 from a distance B in a base length direction of the lenses 121a and 121b set up in advance and the focal length F of these lenses.

$$L = B \times F / (x1 + x2) \quad \text{(Formula 2)}$$

Next, the operation of the image pickup system comprising the camera 1 configured as in FIG. 1 and the AF calibration device 2 will be described in detail based on the flowchart of FIGS. 14 and 15.

Figure 14:
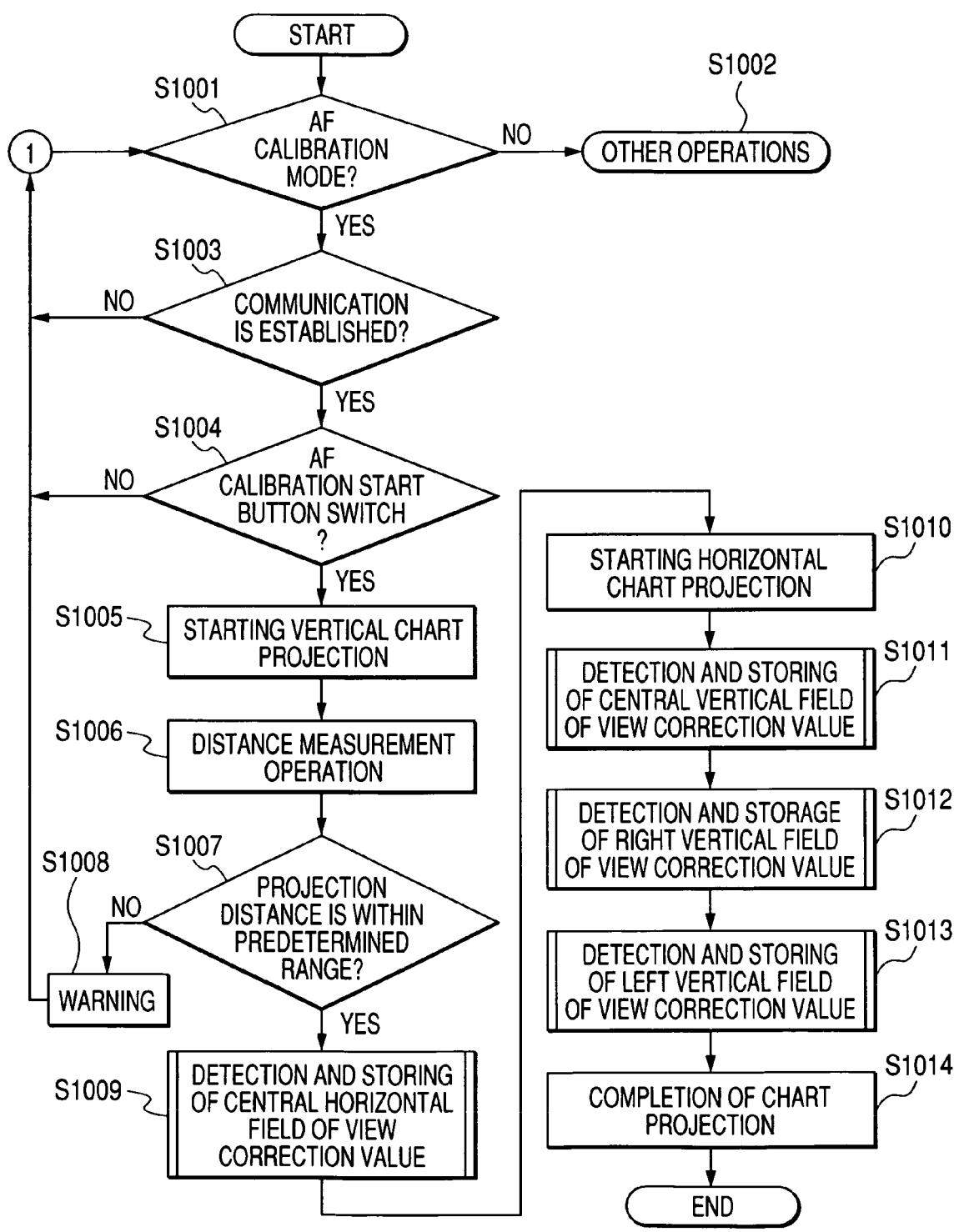
FIG. 14 is a flowchart showing the operation of the image pickup apparatus according to one embodiment of the present invention.

First, at step S1001 of FIG. 14, it is determined whether or not a camera mode is set to the AF calibration mode, from the state of the switch group 114. Here in case the camera mode is set to the AF calibration mode, the procedure advances to the operation of step S1003. In the meantime, in case the camera mode is set to other than the AF calibration mode, other camera operations subsequent to step S1002 are executed.

The AF calibration mode is set in the case of being out of focus since a new lens is purchased or the like, so that of information on the lens and the camera unit, or in the case of being out of focus due to aged deterioration or the like.

At step S1003, the camera CPU 100 performs communications with the AF calibration CPU 200 through the strobo communication circuit 103, and determines whether or not the AF calibration device 2 is correctly mounted on the camera 1. In case the AF calibration device 2 is correctly mounted on the camera 1 and can normally perform communications, the procedure advances to the operation of step S1004, and in case the communications are abnormal, the procedures returns to step S1001.

At step S1004, it is determines whether or not an AF calibration start button is depressed in the state of the switch grope 114. In case the start button is depressed, the procedure advances to step S1005, and if the start button is not depressed, the procedure returns to the operation of step S1001.

At step S1005, the AF calibration CPU 200 performs a lighting drive of the LED 212a through a LED drive circuit 202, and at the same time, sets the direction of the chart pattern slit 702 to the direction of a vertical line chart, and starts the projection of a vertical line chart light. At the next step S1006, the light flux from the vertical line chart projected by the operation at step S1005 is received by the distance measurement sensor 203, and based on the output from the distance measurement sensor 203, the AF calibration CPU 200 performs a distance measurement calculation, and measures a distance from the camera 1 (AF calibration device 2) to a chart projection plane.

At the next step S1007, based on the output from the distance measurement sensor 203, it is determined whether or not the distance to the projection plane is within a predetermined range. Here, the distance which is 30 to 70 times as long as the focal distance of the photographic lens which is the distance from the camera 1 to the projection plane, is taken as an appropriate distance range for performing the detection of the correction value, and in case it is within the appropriate distance range, the procedure advances to the operation of step S1009. In case it is out of the appropriate distance range, the procedure advances to step S1008, and warns the user by the warning display device 109 that the camera 1 be moved to the appropriate distance, and returns to the operation of step S1001. Here, the appropriate distance range for detecting the correction value is not limited to the above described distance range, and it may be changed according to the type of the photographic lens mounted on the camera 1. Here, the reason why the distance is measured in this manner by using the distance measurement sensor 203 is as follows. That is, to perform a calibration, it is appropriate to perform it at a distance from 30f to 70f where there exists few stopping error of the lens. Note that character f denotes a focal length of the lens to be used. The phase difference AF within the camera, while being good at the determination of the in-focus state, is not good at the measurement of the distance. Hence, the distance is measured by using the distance sensor 203.

At the next step S1009, the detection of the correction value of the focus detection result in the central horizontal field of view by the first focus detection system and the storage of the correction value are performed. The detail of the operation here will be described later by using FIG. 15. At the next step S1010, the direction of the chart pattern slit 702 is set to the direction of the horizontal line chart so as to perform the projection of the horizontal line chart, and at the subsequent steps S1011 to S1013, the correction value of the focus detection result in each of the central vertical field of view, the right vertical field of view, and the left vertical field of view and the storage of the correction value are performed. Finally at step S1014, the driving by the LED drive circuit 202 is stopped so as to complete the projection of the chart light, thereby completing a series of operations.

Next, the detail of the operation (the detection of the error difference correction amount of the focus detection result in the central horizontal field of view and storage thereof) at step S1009 of FIG. 14 will be described by using the flowchart of FIG. 15.

First, at step S2001, it is determined whether or not the lighting drive of the LED 212a having the wavelength of 650 nm is performed by the LED drive circuit 202. In case the lighting drive of the LED 212a having the wavelength of 650 nm is performed, the procedure advances to the operation of step S2003. In case the lighting drive of the LED other than the LED 212a is performed, the procedure advances to step S2002, and changes over the LED drive, and performs the lighting drive of the LED 212a. At the next step S2003, based on the signals from the sensor arrays 111e and 111f of the focus detection sensor 101, the focus detection of the central horizontal field of view is performed by the first focus detection system.

At the next step S2004, based on the focus detection result at step S2003, an in-focus determination is made, and if being in-focus, the procedure advances to the operation of step S2006. If not being in-focus, the procedure advances to step S2005, and based on the information on the focus detection result, the camera CPU 100 performs the driving of the focus lens within the photographic lens 60 through the lens communication circuit 105, and the procedure returns to the operation of step S2003, and subsequently, the same operation is repeated.

At step S2006, it is determined whether or not image waveforms obtained by the sensor arrays 111e and 111f correctly receive a projection chart projection light. In case the projection chart light is correctly received, the procedure advances to step S2008. In case the projection chart light is not correctly received, the procedure advances to step S2007, and a warning is issued to the user by the warning display device 109, and the procedure returns to the operation of step S1001 of FIG. 14.

Here, one example of the method of determining whether or not the projection chart light is correctly received will be described by using FIGS. 18A and 18B, and FIGS. 19A and 19B.

Figure 18A:
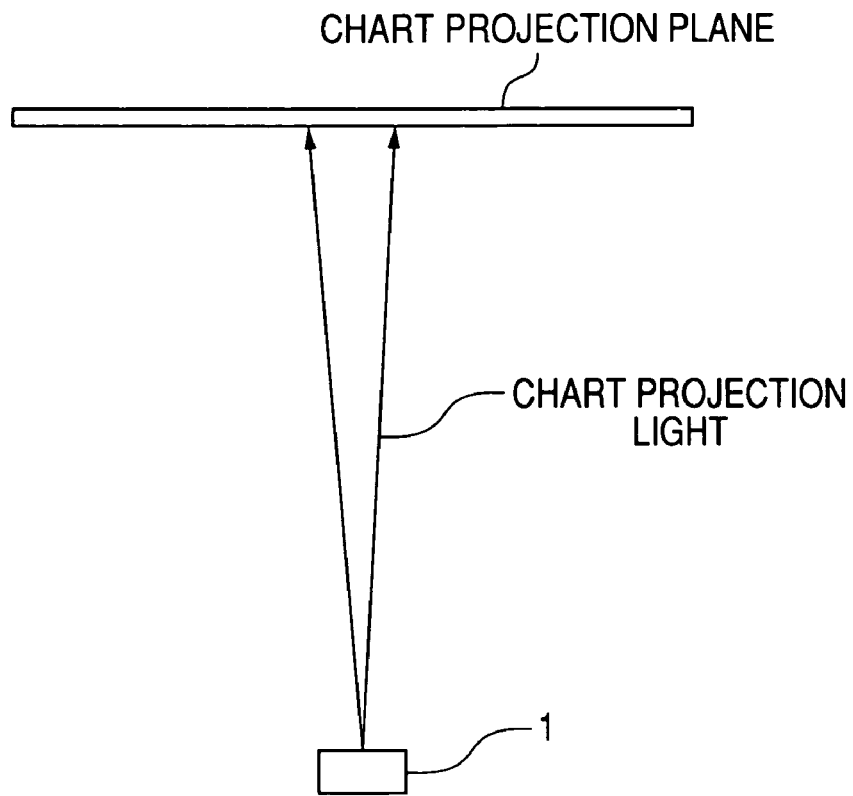
FIGS. 18A and 18B are explanatory drawings regarding a case where it is determined that the chart light projected from the AF calibration is correctly received in one embodiment of the present invention.
Figure 18B:
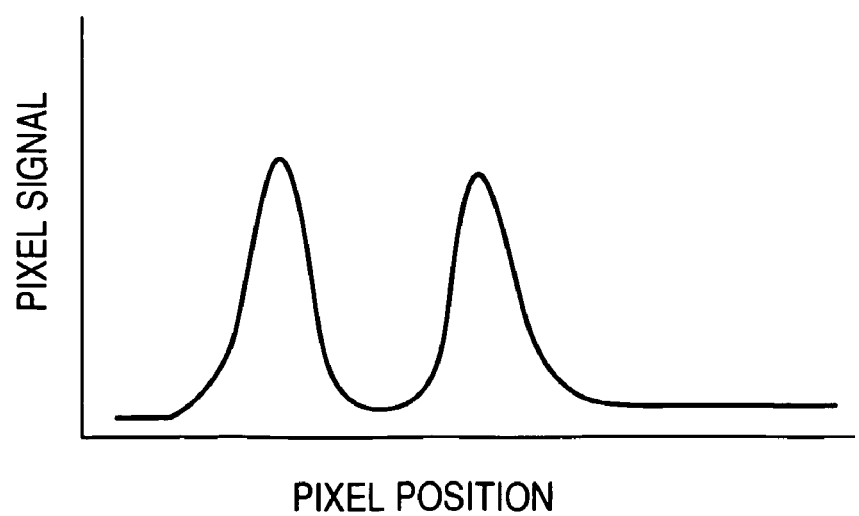

FIG. 18A is a view showing a situation where the chart light is appropriately projected on the chart projection plane. Further, the signal image from the sensor array 111e of the focus detection sensor 101 at this time is shown in FIG. 18B. Since two vertical line charts are projected in the sensor array 111e, the signal images of two mountains corresponding to the chart can be obtained.

Figure 19A:
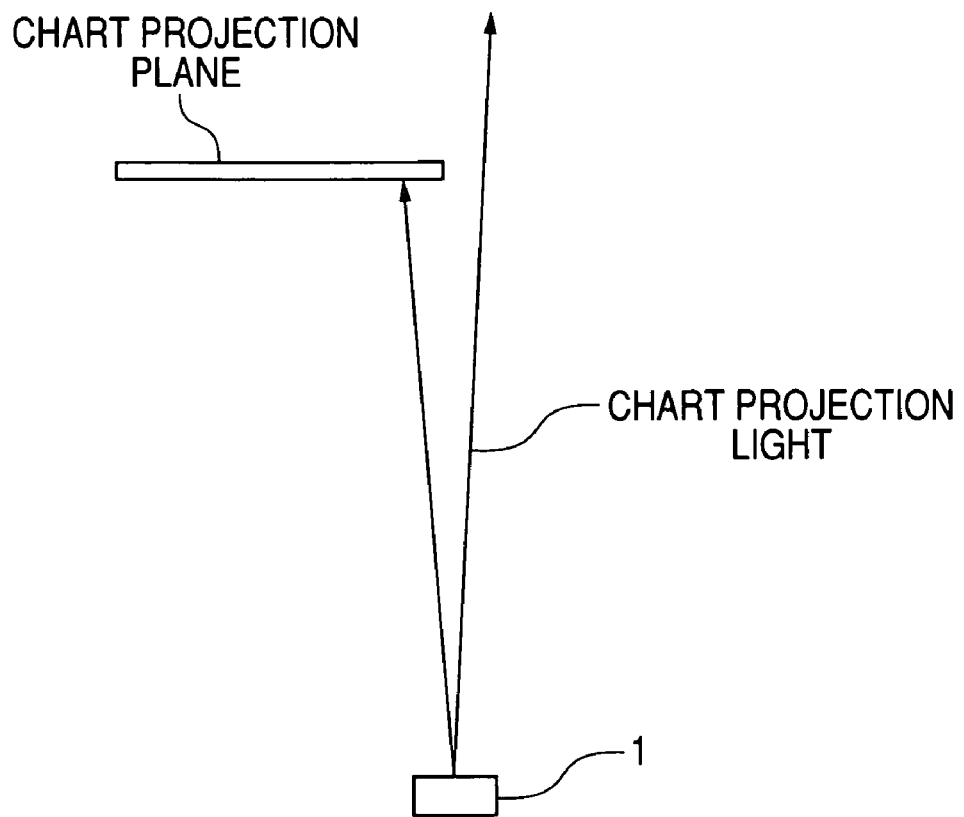
FIGS. 19A and 19B are explanatory drawings regarding a case where it is determined that the chart light projected from the AF calibration is not correctly received in one embodiment of the present invention.
Figure 19B:
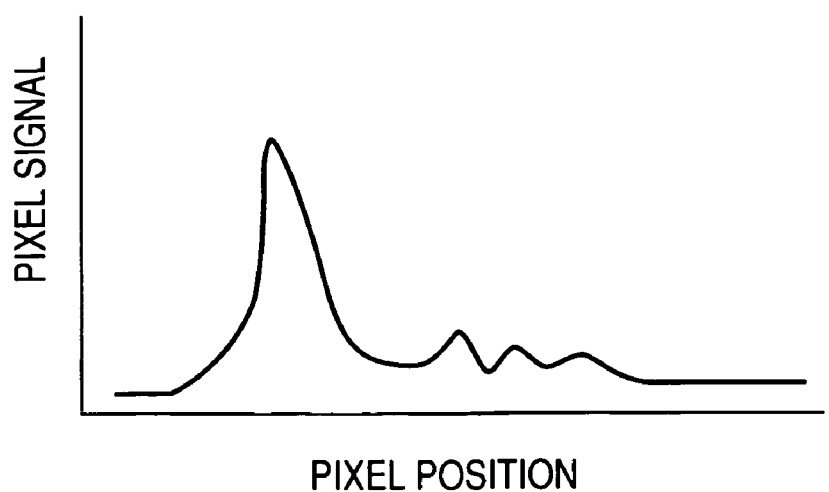

FIG. 19A is a view showing the situation where the chart light is inappropriately projected on the chart projection plane. Further, the signal image from the sensor array 111e of the focus detection sensor 101 at this time is shown in FIG. 19B. Since only one chart of two vertical line charts is reflected on the chart projection plane to the sensor array 111e, a signal line of only one mountain is obtained. Further, the light from a material body at the side far away from the chart projection plane appears as a signal image, and in case the focus detection is performed by these signal images, there arises an error in the focus detection results (far and near competition). Hence, by comparing the interval and the width of the mountain decided by projection chart dimension with the signal image, it can be determined whether or not the vertical line chart is appropriately projected.

Returning to FIG. 15, at step S2008, based on the contrast estimation value detected at the predetermined focus interval starting from the in-focus position detected by the first focus detection system (S2003 to S2005), an in-focus position is detected (the second focus detecting system). At the next step S2009, the difference between the in-focus position by the first focus detection system and the in-focus position by the second focus detection system is calculated, and is stored in the EEP ROM within the camera CPU 100 as the correction value of the fist focus detection system. Further, the focus detection field at the time when the correction value is calculated and the wavelength of the LED which is the projection chart light are also stored correspondingly.

At the next step S2010, it is determined whether or not the measurement of the correction value using the LED 212b having the wavelength of 550 nm is completed in the current measurement operation. In case the measurement using the LED 212b having the wavelength of 550 nm is already completed, the procedure advances to step S2012. In case the measurement is not yet completed, the procedure advances to step S2011, and by the LED drive circuit 202, the measurement is changed over to the lighting drive of the LED 212b of the wavelength of 550 nm, and the procedure returns to the operation of step S2003, and then, the in-focus position detection operation with the wavelength of 550 nm and the storage operation of the correction value are performed.

At step S2012, it is determined whether or not the measurement of the correction value using the LED 212c having the wavelength of 450 nm is completed in the current measurement operation. In case the measurement by the LED 212c having the wavelength of 450 nm is already completed, it is determined that the in-focus detection operation for all wavelengths (650 nm, 550 nm, and 450 nm) and the storage operation of the correction value are completed, and by completing a series of operations, the procedure returns to a main routine. If not yet completed, the procedure advances to step S2013, and by the LED drive circuit 202, the measurement is changed over to the lighting drive of the LED 212c having the wavelength of 450 nm, and the procedure returns to the operation of step S2003, and then, the in-focus detection operation with the wavelength of 450 nm and the storage operation of the correction value are performed.

Figure 15:
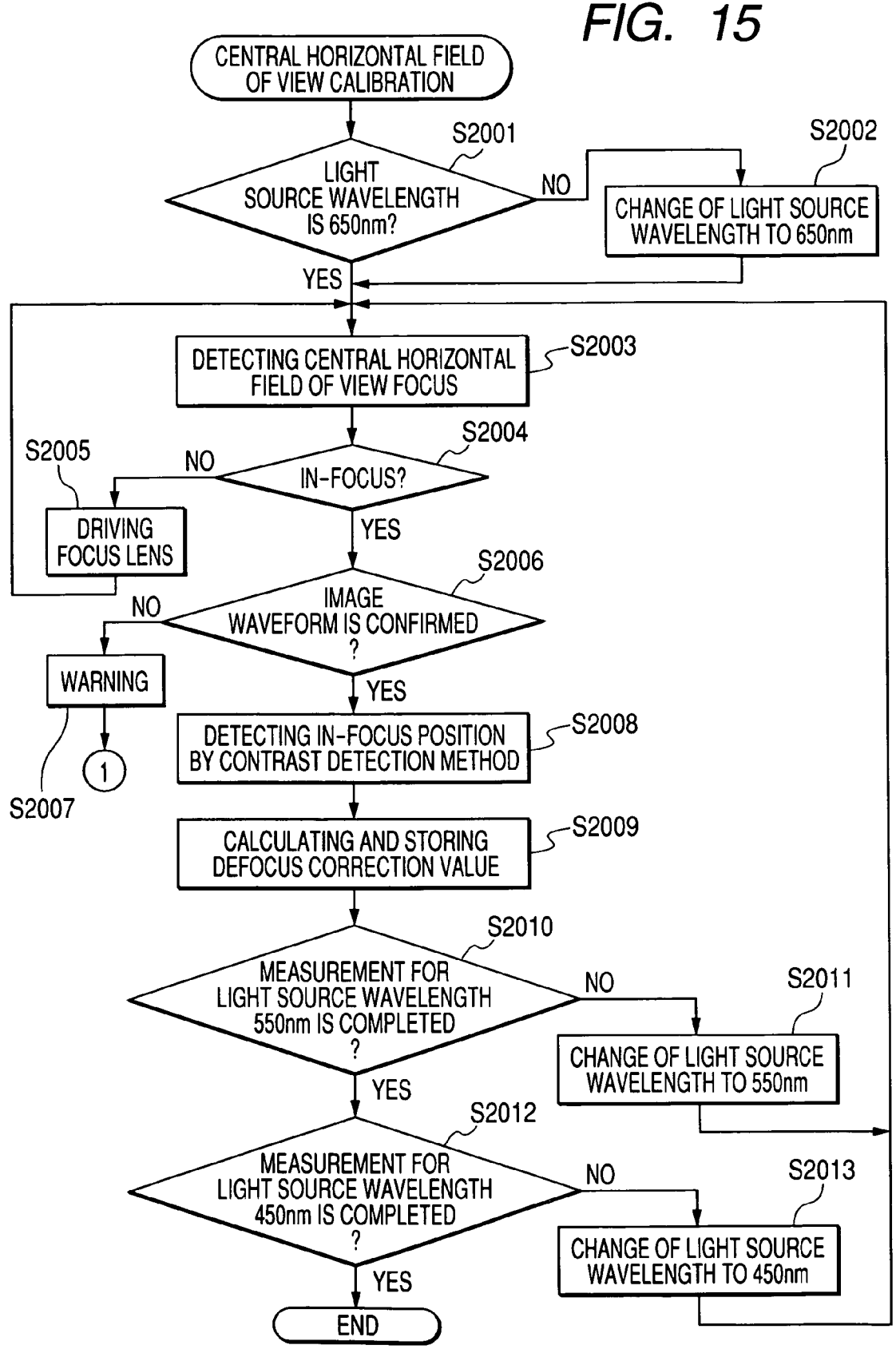
FIG. 15 is a flowchart showing the detail of the operation at step S1009 of FIG. 14.

At steps S1012 and S1013 of FIG. 14, by using the sensor arrays of the in-focus detection sensor 101 and the pixel range within the image pickup sensor 106 corresponding to each filed of view, the same operation as FIG. 15 is performed, and therefore, the description thereof will be omitted.

In FIG. 20 is shown one example of the correction amount stored in the AF calibration operation of FIGS. 14 and 15.

Figure 17:
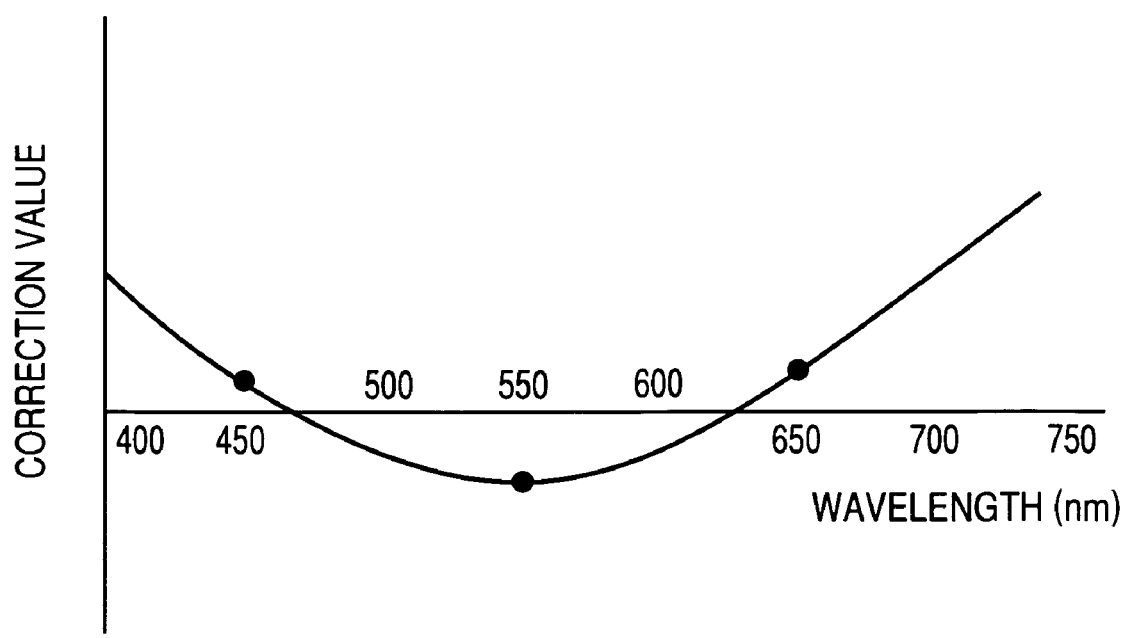
FIG. 17 is a view showing one example of the relation between a subject wavelength and the correction value of the focus result in one embodiment of the present invention.

In the actual photographic operation, by using the focusing result in each focus detection field of view detected by the focus detection sensor 101 and the correction amount corresponding to the object wavelength information, the drive of the photographic lens is performed. One example of the relation between the object wavelength and the correction value of the focusing result is shown in FIG. 17. As shown in FIG. 17, the correction value may be calculated by interpolating the correction values of 450 nm, 550 nm, and 650 nm by polynomial equation approximation.

According to the above described embodiment, the following advantages can be obtained.

(1) When the AF calibration mode is set by the operation of a start button, the chart light is projected toward the object by the AF calibration device 2, and based on the reflected light by the object of this chart light, a defocus amount (focus state) is detected by first focus detection means and the second focus detection means, and the correction value is calculated, which allows the defocus amount detected by the first focus detecting means to be matched with the defocus amount detected by the second focus detection means, and at the same time, this correction value is stored. At the actual photographing time, based on the defocus amount detected by the first detection means and the stored correction value, the focus adjustment lens within the photographic lens is driven, thereby performing focus adjustment.

Hence, in case the user desires to obtain the correction value, the AF calibration operation can be briefly (since it is started only by operation of the start button) and appropriately performed, and at the time of photographing, it is definitely attained to prevent an inappropriate correction of the defocus amount from being executed due to the failure of the AF calibration.

Describing more in detail, since the projection direction of the chart light is controlled in such a manner that the chart light is projected in the direction orthogonal to the row direction of the sensor arrays that configure the focus detection sensor 101, at the AF calibration time, the projection of the chart light to an appropriate position can be performed. Further, when the chart light is projected, based on a plurality of signal images obtained by each sensor of the focus detection sensor 101, it is determined whether or not the projection of the chart light to the object is appropriate, and in case it is determined not appropriate, an warning is issued by the warning display device 109, and therefore, in case the projection direction of the chart light to the object is not appropriate, the user can be notified to that effect, and it is possible to lead the image pickup system to a position where no warning is issued. Further, when the chart light is projected, the distance to the object from the camera 1 is calculated by the distance measurement device within the AF calibration device 2, and this distance information and the predetermined distance information are compared, and it is determined whether or not a projection plane position (subject position) is in an appropriate distance range to perform the AF calibration, and when it is out of the appropriate distance range, an warning is issued by the warning display device 109, and therefore, the user can be notified to that effect, and similarly to the above described case, it is attained to lead the image pickup system to a position where no warning is issued.

(2) At the AF calibration mode time, the chart light is projected toward the object in order of a plurality of different optical wavelengths, and based on the reflected light by the object of each chart light, the defocus amount is detected by the first focus detection means and the second focus detection means, respectively, and a plurality of correction values for the respective optical wavelengths are calculated to match the defocus amount detected by the first focus detection means with the defocus amount detected by the second focus detection means, and are stored. By providing wavelength detection means for detecting the wavelength of the reflected light from the object, at the photographing time, based on the defocus amount detected by the first focus detection means and the correction value corresponding to the optical wavelength at that time detected by the wavelength detection means, the focus adjustment lens is driven, so that the focus adjustment can be performed. Hence, even for different wavelength of the object light and different chromatic aberration of the photographic lens, it can be attained to appropriately correct the defocus amount at the photographing time.

While the wavelength detection means has not been described in detail in the embodiment, the pixels forming each sensor array of the focus detection sensor 106 are provided with a plurality of color filters different in transmission wavelength, and it is possible to detect wavelength components of the light from the object at that time by a ratio of pixel signals.

(3) As apparent from FIG. 2, since the AF calibration device 2 is detachably attachable to the camera 1, the hand-carrying of the image pickup system, the camera 1, and the AF calibration device 2 becomes simple and convenient.

With regard to making it convenient to hand-carry, though the accuracy is sometimes slightly reduced, for example, an AF auxiliary light (shorter wavelength having a pattern is desirable) is used instead for the AF calibration device 2, thereby making it possible to hand-carry simply and conveniently.

The object of the present invention can also be achieved by providing a storage medium storing program codes for performing the aforesaid processes to an image pickup system or apparatus, reading the program codes, by a CPU or MPU of the image pickup system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image pickup system or apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image pickup system or apparatus or in a memory provided in a function expansion unit which is connected to the image pickup system or apparatus, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart of FIG. 14 or 15 described in the embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2004-212441 filed on Jul. 21, 2004, which is hereby incorporated by reference herein.

What is claimed is:

1. An image pickup apparatus for controlling a drive of a focus adjustment lens within a photographic lens by taking at least a stored correction value into consideration of a detected defocus amount, comprising:
   an image pickup sensor which receives a light flux having passed through a photographic lens and photoelectrically converting the received light flux;
   a focus detection sensor which receives a pair of light fluxes from the light flux having passed through said photographic lens and photoelectrically converting the received pair of light fluxes;
   a first focus detection unit which detects a defocus amount based on the phase difference of an object image photoelectrically converted by said focus detection sensor;
   a second focus detection unit which outputs an estimation signal for estimating the contrast of the object image photoelectrically converted by said image pickup sensor; and
   a control unit which effects control to calculate a correction value for correcting the defocus amount based on the value outputted from said first focus detection unit and said second focus detection unit, respectively, depending on light projected by a light projecting unit, associated with the image pickup apparatus, in one light projection pattern selected from among a plurality of pattern, and store that correction value.

2. The image pickup apparatus according to claim 1, wherein said control unit controls a light projection direction of the light projecting unit so as to project a light to a direction different from a row direction of sensor arrays comprising said focus detection sensor.

3. The image pickup apparatus according to claim 1, wherein said control unit determines whether the projection of the light to an object is appropriate or not.

4. The image pickup apparatus according to claim 1, further comprising a distance measurement unit which measures a distance to the object, wherein said control unit determines whether the distance is within an appropriate distance range based on the information obtained from said distance measurement unit.

5. The image pickup apparatus according to claim 1, further comprising:

a wavelength detection unit which detects the wavelength of an object light, and wherein said control unit controls the light projection unit to project light for a plurality of different wavelengths, and effects control so as to receive the object light of each wavelength to calculate and store a correction value.

6. The light projection device according to claim 1, wherein the light projecting unit is detachably mountable to the image pickup apparatus.

\* \* \* \* \*